United States Patent [19]

Becker et al.

[11] Patent Number: 4,550,268

[45] Date of Patent: Oct. 29, 1985

[54] BRUSH MOUNTING ON ELECTRIC MOTORS EQUIPPED WITH RADIO-INTERFERENCE SUPPRESSION CHOKES, PARTICULARLY FOR HOUSEHOLD APPLIANCES SUCH AS VACUUM CLEANERS OR THE LIKE

[75] Inventors: Dietmar Becker, Radevormwald; Klaus-Dieter Wilcke, Gevelsberg, both of Fed. Rep. of Germany

[73] Assignee: Vorwerk & Co. Interholding GmbH, Wuppertal, Fed. Rep. of Germany

[21] Appl. No.: 499,092

[22] Filed: May 27, 1983

[30] Foreign Application Priority Data

Jun. 3, 1982 [DE] Fed. Rep. of Germany ....... 3220877

[51] Int. Cl.$^4$ ............................................. H02K 13/00
[52] U.S. Cl. ...................................... 310/239; 310/72
[58] Field of Search ...................... 310/239, 50, 72, 51, 310/68 R, 42, 220, 221, 222, 242, 245, 246, 247; 307/105

[56] References Cited

U.S. PATENT DOCUMENTS

| | | | |
|---|---|---|---|
| 1,132,304 | 3/1915 | Cunningham | 310/239 |
| 2,334,722 | 11/1943 | Mirick | 310/68 R |
| 4,329,605 | 5/1982 | Angi | 310/68 R |
| 4,340,831 | 7/1982 | Kuhlmann | 310/68 R |
| 4,342,934 | 8/1982 | van Wijhe | 310/68 R |
| 4,389,588 | 6/1983 | Rankin | 310/242 |

FOREIGN PATENT DOCUMENTS 1588975 5/1970 Fed. Rep. of Germany ...... 310/239

Primary Examiner—R. Skudy
Attorney, Agent, or Firm—Martin A. Farber

[57] ABSTRACT

A brush mount on electric motors equipped with a radio-interference suppression choke (24), particularly for household appliances such as vacuum cleaners or the like, having a support part (7) of non-conductive material which is fastened in the motor frame (1) and into which a guide sleeve (13) of conductive material for the carbon brush (15) with its tensioning spring (17) is inserted by form lock in axially non-displaceable manner between two side walls (9, 10) extending from a web (8), the rear end of the guide sleeve (13) having a connection lug (50) for the conductor of the carbon brush (15). In order to obtain a structurally advantageous development and particularly a vibration-free holding of the guide sleeve, the free edges of the side walls (9, 10) bear a cover (28) which supports the guide sleeve (13) and that the web (8) of the support part (7) forms wings (34, 35) which protrude outward beyond the side walls (9, 10) and serve as resting surfaces for the spring-tensioning mounting on the motor frame (1) and that openings (37 and 38 respectively) are provided in the rear region of the support part (7) on both sides of the side walls (9, 10) for the mounting in locked position of the radio-interference suppression choke (24) and a plug distribution plate (42).

20 Claims, 10 Drawing Figures

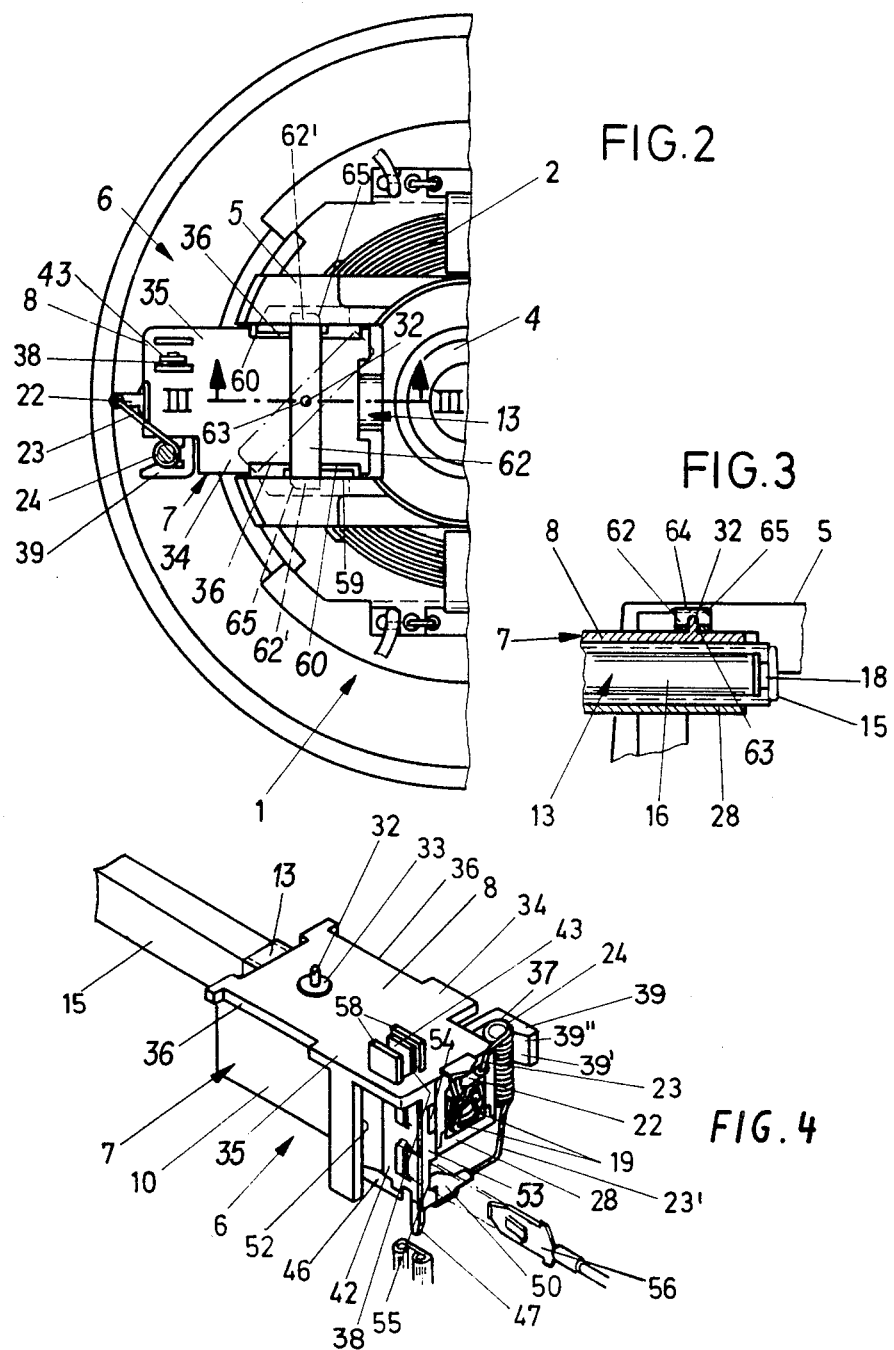

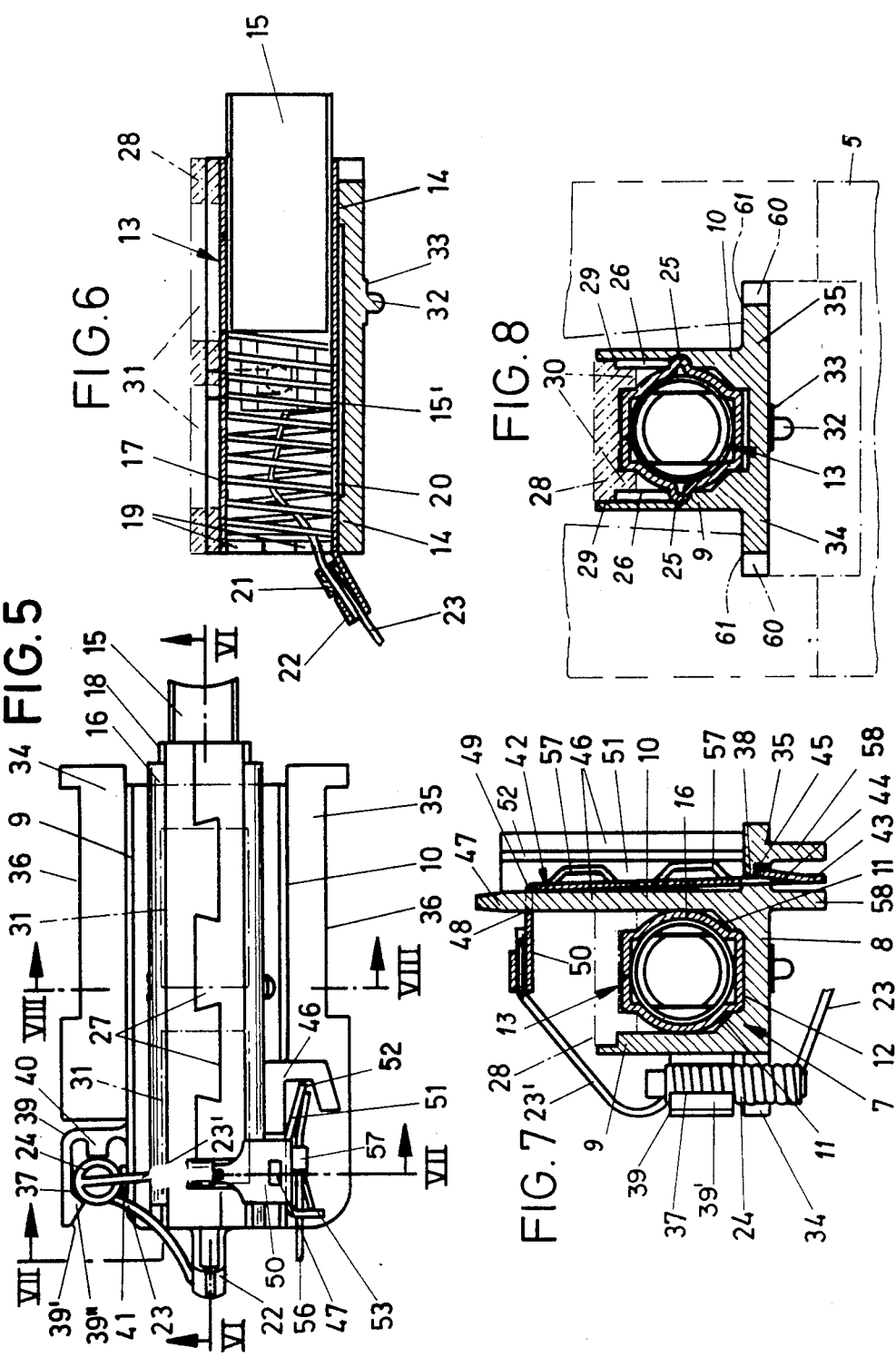

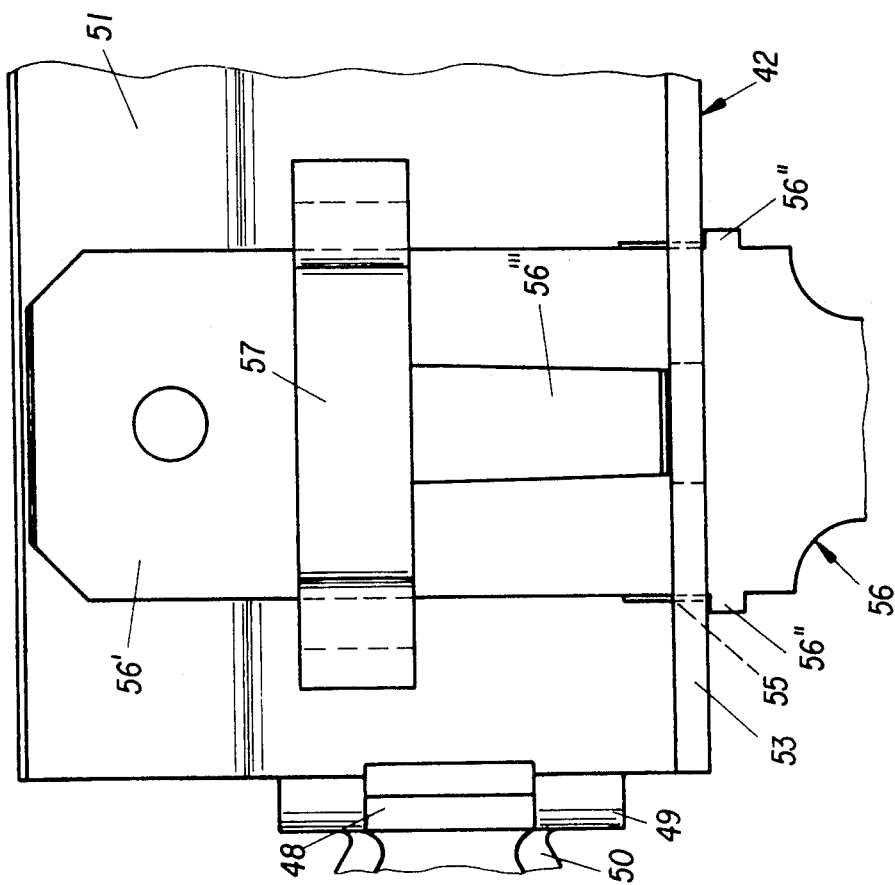
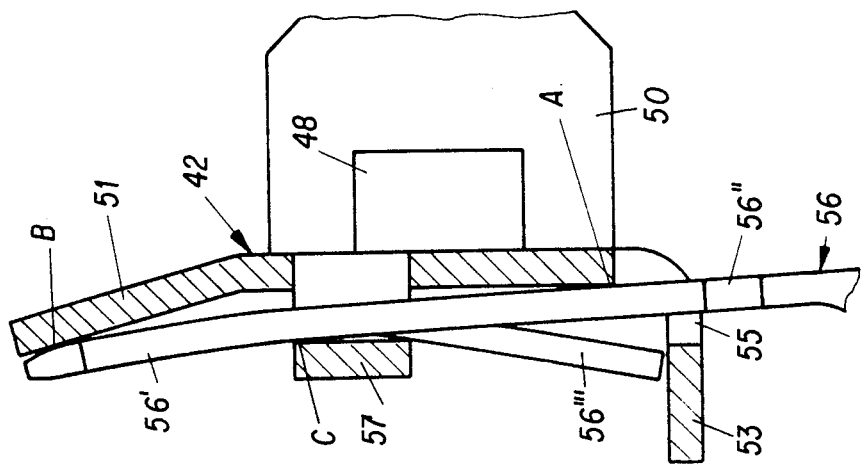

BRUSH MOUNTING ON ELECTRIC MOTORS EQUIPPED WITH RADIO-INTERFERENCE SUPPRESSION CHOKES, PARTICULARLY FOR HOUSEHOLD APPLIANCES SUCH AS VACUUM CLEANERS OR THE LIKE

The present invention relates to a brush mount on electric motors equipped with radio-interference suppression chokes, particularly for household appliances such as vacuum cleaners and the like, having a support part of non-conductive material which is fastened to the motor frame in which a guide sleeve of conductive material for the carbon brush with its tensioning spring is inserted by form lock in axially non-displaceable manner between two side walls extending from a web, the rear end of the guide sleeve having a connection lug for the conductor of the carbon brush.

From German Federal Republic OS 1 588 975 a brush mount is known in which the support part has a web which extends over the length of the guide sleeve. In the central region, relatively short side walls extend from it. The guide sleeve, which is of U-shaped cross-section, is coordinated with the support part in the manner that the open side sits on the web, producing a form lock. In order to fix the inserted guide sleeve in position, the ends of a leaf spring which presses against it, engage in niches provided on the side walls. The side walls continue in hook shaped sections which serve for the passage of the screws which fasten the support part to the frame of the motor. The fastening of the support part to the frame of the motor is, on the one hand, difficult. In the event of incorrect alignment it may happen that the carbon brush received by the guide sleeve does not come into the proper position with respect to the commutator. Furthermore, the guide sleeve with its carbon brush is not held secure against vibration in the support part. This may lead to a non-uniform power consumption by the motor and to brush sparking since the carbon brush changes its position on the periphery of the commutator.

The object of the present invention is to develop a brush mount of the aforementioned type in a manner which is simple to manufacture and advantageous in use, so that the support part keeps the guide sleeve free of vibrations, necessarily brings about in all cases correct alignment upon its installation on the motor frame and performs further holding functions.

This object is achieved in the manner that the free edges of the side walls (9, 10) bear a cover (28) which supports the guide sleeve (13) and that the web (8) of the support part (7) forms wings (34, 35) which protrude outwardly beyond the side walls (9, 10) and serve as resting surfaces for the spring-biased mounting on the motor frame (1) via, such as, spring leaf (62), and that openings (37 and 38 respectively) are provided in the rear region of the support part (7) outwardly beyond the side walls (9, 10) for the mounting in locked position of the radio-interference suppression choke (24) and a plug-type distribution plate (42).

As a result of this development, there is obtained a brush mount of the above type which is of increased value in use. The guide sleeve is fastened completely free of play and vibration in the support part, avoiding an irregular consumption of power by the motor and brush sparking. The cover which is placed on the free edges of the side walls, secures the guide sleeve in its inserted position. The guide sleeve which receives the carbon brush is installed before the application of the cover. The cover is then fastened immovably in suitable manner so that the guide sleeve lies in a channel which is closed on all sides. The wings of the web, which form the support surfaces, always assure exact alignment of the support part upon mounting on the motor frame. The carbon brush therefore is brought into the proper alignment with respect to the commutator. The support part of the brush mount then need only be placed under spring tension. The installing and possible replacing of the brush mount can therefore be carried out easily. Furthermore, the support part affords the possibility of mounting the radio-interference suppression choke and plug distribution plate without additional structural parts, thus leading to a compact construction, and it permits mechanical separation between the carbon brush and the electrical contacting of the connection terminal.

One advantageous further development resides in developing the opening (37) for the holding of the radio-interference suppression choke (24) in the form of a clamping jaw which is open towards the rear. Therefore in order to attach the suppression choke, which is of larger cross section than the clamping jaw, it need merely be inserted into the clamping jaw, it engaging in the end insertion position and being then held substantially free of vibration.

In order to impart also the plug distribution plate a substantially vibration-free arrangement, the opening (38) for holding the plug distribution plate (42) in the wing (35) is arranged directly alongside the one side wall (10) which forms a lug (46) extending over the cover (28) and continuing in a holding projection (47) which passes through an opening (48) in the region of the bend (49) of a connection lug (50) which is bent off from the plug distribution plate (42) in the direction towards the suppression choke (24).

The inserted plug distribution plate is imparted increased stability in the manner that a bent edge (51) of the plug distribution plate (42) extends into a shaft (52) in the support part (7). A clamp seat can be produced by suitable bending. The shaft is located in the lug which extends from the one side wall.

In order to protect the insertion end of the plug distribution plate which extends through the opening in the web from damage, lugs (58) of the support part (7) protrude above the top of the web (8) on both sides of the opening (38) for the holding of the plug distribution plate. Furthermore, these lugs prevent the plug distribution plate from being pushed out from above.

The installing of the brush mounting is facilitated by the fact that the top of the web (8) bears a centering projection (32) which engages into an opening (63) in a bent leaf spring (62) which rests against the top of the web (8) and whose ends (62') engage under flexural tension below holding shoulders (64) on the motor frame (1). The leaf spring can therefore not be improperly installed. It always comes into the proper position, resulting in proper clamping of the brush mount on the motor frame.

The possible discharge of heat from the guide sleeve which receives the carbon brush is favored by the fact that the cover (28) is provided with openings (31).

In order to secure the brush mount transverse to the plane of application of the wings (34, 35), edge cutouts (36) present in said wings are provided, into which ribs (60) of the motor frame (1) engage in form-locked manner.

In addition to this, it is advantageous for the edge end (51) of the plug distribution plate (42), which end extends into the shaft (52), to be bent transverse to the direction of introduction of the plug and form a run-on bevel for the end (56') of a connecting plug (56). In this way the end of the connecting plug is diverted corresponding to the course of the bend, obtaining a reserve of additional tension which assures permanent contact between plug distributor and connecting plug.

The guide sleeve (13) is imparted a stable structural shape and axial locking in position by the fact that it is developed as an annularly closed shaft whose side walls are provided with outwardly directed extensions (25) which engage in grooves (26) in the inner surfaces of the side walls (9, 10).

In this connection it is advantageous that the edges (27) of the walls of the guide sleeve (13) which are bent to the shaft engage in dovetail manner in each other.

In order to facilitate the mounting on the frame of the motor of the leaf spring (62) acting on the support part, said spring is provided with run-on bevels (65) on diagonally opposite corners. Accordingly, by the carrying out of a turning motion the leaf spring can be swung into its clamping position, in which it is then locked.

With the above and other objects and advantges in view, the present invention will become more clearly understood in connection with the detailed description of a preferred embodiment, when considered with the accompanying drawings, of which:

FIG. 2 is a partial top view of the electric motor;

FIG. 3 is a cross-section along the line III—III of FIG. 2;

FIG. 4 shows a brush mount in perspective;

FIG. 5 is an enlarged bottom view of the support part which receives the guide sleeve for the carbon brush, the cover being indicated in dot-dash line;

FIG. 6 is a section along the line VI—VI of FIG. 5;

FIG. 7 is a section along the line VII—VII of FIG. 5;

FIG. 8 is a section along the line VIII—VIII of FIG. 5;

FIG. 9 is a greatly enlarged cross-section through the plug distribution plate in the region of a connecting plug associated with it; and FIG. 10 is a developed view of FIG. 9.

Figure 1:
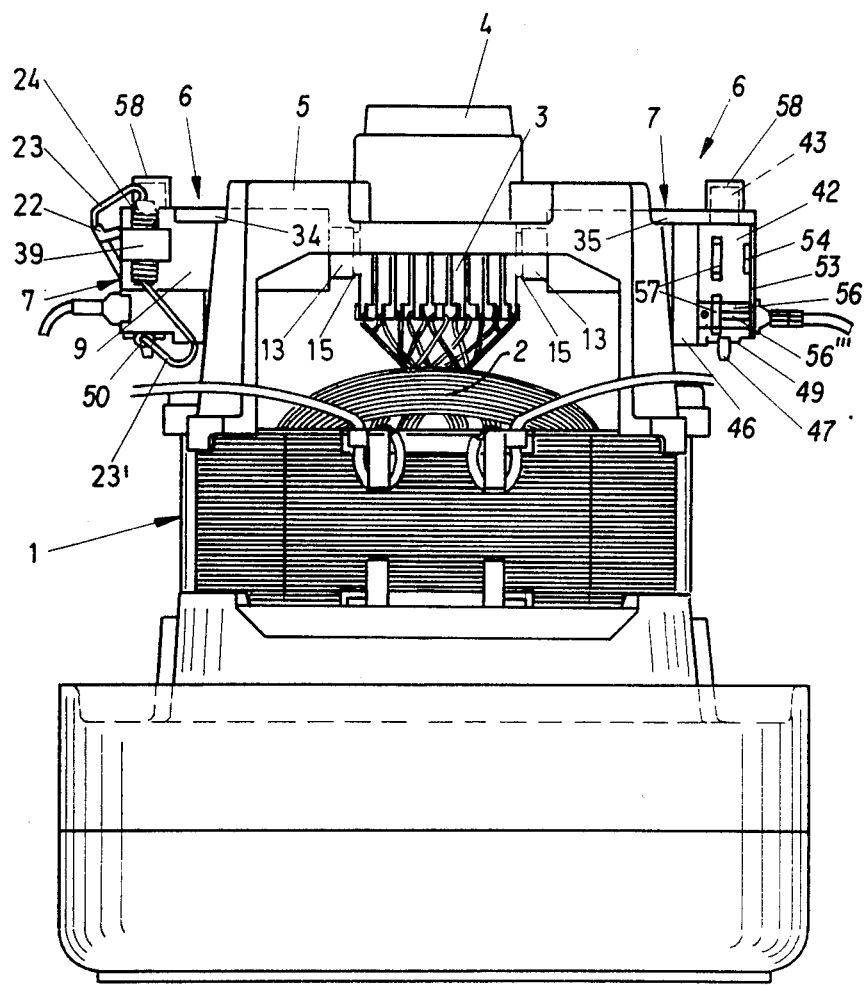
FIG. 1 is a view of an electric motor provided with the brush mounts.

The electric motor has a motor frame 1. The frame contains a stator winding 2, which surrounds a rotor (not shown). A commutator 3 is seated on the rotor. The end of the rotor shaft (not shown) which protrudes above the commutator travels in a bearing 4 of a diametrally extending bridge 5 of the motor frame 1.

On both sides of the commutator 3 the bridge 5 receives brush mounts 6 which are of identical development to each other.

Each brush mount 6 contains a support part 7 of U-shaped cross section made of insulating material. From the web 8 of the support part 7, side walls 9 and 10 extend over the entire length of the web. At the end adjacent the web, the inner surfaces of the side walls form run-on bevels 11 arranged in front of a supporting section 12 which engages in part around a guide sleeve 13 made of conductive material. On its inside, the web 8 is provided with end elevations 14 on which the guide sleeve 13 rests; see in particular FIG. 6.

The guide sleeve 13 has a substantially rectangular cross-section to receive the carbon brush 15, which is of corresponding cross-sectional shape. The support part 7 and the web 8 thereof have a length in the same direction as the length of the carbon brush 15 and the guide sleeve 13. In its central region, the rectangular profile of the guide sleeve 13, as a result of opposite bulges 16, forms a circular cross-section for the guiding of a compression spring 17 which acts on the carbon brush 15.

In order to prevent the compression spring from sliding on the commutator 3 after the carbon brush 15 has been worn down, the bulges 16 rest, on the other side of a section 18 of smaller cross-section, against the front end of the guide sleeve 13. The compression spring 17 extends over a shoulder 15' on the carbon brush 15 and rests at one end against the shoulder formed between carbon brush 15 and shoulder 15'. The other end of the compression spring 17 rests against inwardly bent lugs 19 on the rear end of the guide sleeve 13. From the carbon brush 15 there extends a rearward-directed copper cable 20 which is connected by a clamp 21 to one connection end 23 of a radio-interference suppression choke 24. The rear end of the guide sleeve 13 continues in a connecting lug 22 which furthermore connects the connection end 23 of the suppression choke 24 to the end of the pull cable 20 and fixes said ends; see FIG. 6.

The side walls, provided with bulges 16, of the guide sleeve 13 which is developed as a completely enclosed shaft are provided with outwardly directed extensions 25. The latter are produced by stamping and extend into grooves 26 aligned perpendicularly to the web 8 of the support part 7 in the inner surfaces of the side walls 9, 10. In this way the guide sleeve 13, which extends over the length of the support part 7, is fixed in position in axial direction.

The guide sleeve 13 is formed by bending from a single piece, the edges 27 engaging in dovetail manner in each other, as can be noted from FIG. 5.

The guide sleeve 13 which is inserted without play from above between the side walls 9, 10 is held in position by a cover 28. The bottom of the latter rests on longitudinal recesses 29 in the free edges of the side walls 9, 10. The cover 28 has two webs 30 which extend in form-fitting manner between the side walls 9, 10 and grip without play over the rectangular section of the guide sleeve 13 which is opposite the web 8; see FIG. 8. The cover 28 can be bonded, welded or otherwise suitably attached to the side walls 9, 10. In this way, the guide sleeve 3 is fixed without vibration in the support part 7. The cover 28 contains two openings 31, shown in dot-dash line in FIG. 5.

The top of the web 8 bears in its central region a centering projection 32, a collar 33 being formed at the place of transition between top side and centering projection 32.

The web 8 of the support part 7 is provided with wings 34, 35 which protrude outward by beyond the side walls 9, 10 in such a manner that the wing 34 terminates at a distance from the rear end of the support part 7; see in particular FIGS. 4 and 5. Recesses or cut-outs 36 are arranged in the edge side of the wings 34, 35, adjacent the front end of the support part 7.

The support part 7 in its rear region has openings 37, 38 on both sides of the side walls 9, 10 respectively. The opening 37 is formed by an angular detent arm 39 which forms a clamping jaw and extends integrally from the side wall 9. An end projection 39" provided with a run-on bevel 39' constitutes, in combination with other webs 40, 41, a three-point support for the radio-interference suppression choke 24.

The other opening 38 is associated with a plug distribution plate 42 that enters, via a plug 43, into the opening 38. A bent detent nose 44, which is cut from the material, engages in the inserted position behind a shoulder 45 of the opening 38; see FIG. 7. The opening 38 is alongside the side wall 10, which thus serves as an abutment for the plug distribution plate 42. The side wall 10 is developed with a lug 46 which extends beyond the cover 28 and continues in a holding projection 47 which passes through an opening 48 in the region of the bend 49 of a connecting lug 50 which is bent off from the plug distribution plate 42 in the direction towards the suppression choke 24. The connecting lug 50 is connected with the other connecting end 23' of the suppression choke 24 by clamping.

From the plug distribution plate 42 there extends an edge 51 which is bent transverse to the direction of introduction of the plug and extends in clamping manner into a shaft 52 of the support part 7. This shaft 52 is part of the lug 46 which engages over the cover 28.

The end of the plug distribution plate 42 which is opposite the edge 51 is formed into a bent portion 53. In portion 53 there are introduction openings 54 and 55 for flat plugs 56. At the level of the introduction openings, yokes 57 are obtained by cutting and bending out. A flat plug 56, associated with the plug distribution plate 42, is imparted accordingly a three-point support, in connection with which the two outer points A and B can be considered as resting points and the point C on the yoke 57 as force. The force is produced in the manner that the spring property of the commercial plug 56 is utilized by pressure point C by a suitable positioning of the resting point B. If a flat plug 56 is inserted through the introduction opening 54 or 55, it passes through the corresponding yoke 57. The end 56' of the flat plug then comes against the edge 51, forming a run-on surface where the support pont B lies below the opposing-force point C only by a distance equal to the thickness of the material of the flat plug. Upon further insertion movement, deformation of the flat plug 56 commences starting with a bending which produces an additional reserve of tension. This force differs depending on the design of the angle of the edge 51. The insertion of the flat plug 56 is limited by stops 56" on both sides which strike against the region of the material of the plug distribution plate 42 which is present to the side of the introduction openings 54 and 55 respectively. At the same time, a detent nose 56'" of the flat plug has come in front of the inner surface of the bend 53 and constitutes a protection against pulling out; see in particular FIG. 9.

In order to prevent deformation of the plug 43 of the plug distribution plate 42, lugs 58 are provided which protrude on both sides of the opening 38 from the web 8 and extend over the length of the plug 43.

The insertion of the completely assembled brush mount 6 is effected in the manner that the support part is introduced from above into a recess 59 in the bridge 5. Two opposite ribs 60 of the bridge 5 of the motor frame 1 extend in form-locked manner into the cutouts 36 of the wings 34, 35. The insertion movement is limited by shoulders 61 of the bridge 5, against which the wings 34, 35 forming the resting surfaces strike. A bent leaf spring 62 resting against the top side of the web 8 can now be applied. It has a central opening 63 into which the centering projection 32 engages. With simultaneous pushing and turning of the leaf spring 62, its ends 62' can engage below holding shoulders 64 of the bridge 5. The leaf spring 62 has its curvature lying on the top side or the collar 33 of the web 8. In order to facilitate the introduction of the leaf spring 62, the latter forms on diametrically opposite ends run-on bevels 65 which are obtained by bending.

We claim:

1. In a brush mount on electric motors equipped with a radio-interference suppression choke, particularly for household appliances such as vacuum cleaners and the like, having a support part of non-conductive material which is mounted on a motor frame, and a guide sleeve of conductive material for a carbon brush and its biasing spring being inserted in the support part in a form-fitting manner axially non-displaceably between two side walls extending from a web of the support part, the support part and said web thereof have a length in the same direction as the length of the carbon brush and the guide sleeve, the rear end of the guide sleeve having a connection lug for a conductor of the carbon brush, the improvement wherein the side walls extend substantially the entire length of the web and define free edges of the side walls, a cover means for fixing the guide sleeve in its inserted position in the support part without vibration, said cover means is mounted on the free edges of the side walls, the web of the support part forms wing portions which respectively project outwardly beyond said side walls, said wing portions include resting surfaces for mounting of the support part on the motor frame, spring means for spring-biasing said mounting of the support part on the motor frame, a plug-type distribution plate positioned on said support part, an end portion of the support part outwardly beyond said side walls being formed with respective opening means themselves for holding the radio-interference suppression choke and for holding said plug-type distribution plate, respectively.

2. The brush mount as set forth in claim 1, wherein the opening means for holding the radio-interference suppression choke is formed as a clamping jaw which is open towards said end portion of said support part.

3. The brush mount as set forth in claim 1, wherein one of said opening means is for positioning of the plug distribution plate in one of said wing portions is arranged alongside one of said side walls, said one side wall forms a first lug extending beyond said cover means to and continuing into a holding projection, a connection lug is bent off from said plug distribution plate in a direction towards said suppression choke, said holding projection passes through an opening in the region of the bend of the connection lug.

4. The brush mount as set forth in claim 3, wherein said first lug defines an open shaft, and said plug distribution plate has a bent edge extending into said open shaft of said first lug.

5. The brush mount as set forth in claim 1, wherein one of said opening means for positioning of the plug distribution plate is formed in said web, and a plug portion of said plug distribution plate is received in said one opening means.

6. The brush mount as set forth in claim 1, wherein said spring means comprises a curved leaf spring having an opening, a centering projection formed on said web, said centering projection engaging the opening in said curved leaf spring such that said leaf spring is supported against said web.

7. The brush mount as set forth in claim 6, wherein said motor frame includes holding shoulders and said leaf spring has end portions engaging, with bending tension, below said holding shoulders on the motor frame.

8. The brush mount as set forth in claim 1, wherein said cover means is formed with openings for heat discharge.

9. The brush mount as set forth in claim 1, wherein said wing portions have edges with cut-outs formed therein, and said motor frame has ribs that engage in form-locked manner into said cut-outs and shoulders that abut against surfaces of said wing portions.

10. The brush mount as set forth in claim 1, wherein said plug distribution plate has a yoke portion, and a connecting plug is engageable in the yoke portion of said plug distribution plate for contact with said plug distribution plate at predetermined locations on said plug distribution plate.

11. The brush mount as set forth in claim 10, wherein said yoke portion is disposed intermediate two resting portions of said plug distribution plate, and said two resting portions and said yoke portion comprise said predetermined locations for contact with said connecting plug.

12. The brush mount as set forth in claim 1, wherein grooves are formed in said side walls at inner surfaces thereof extending perpendicularly to said web, and said guide sleeve is formed with outwardly directed extensions that respectively engage in said grooves thereby fixing said guide sleeve in axial position in said support part.

13. The brush mount as set forth in claim 6, wherein said leaf spring is formed with run-on bevels on diagonally opposite corners.

14. The brush mount as set forth in claim 1, wherein said end portion is a rear region.

15. Apparatus according to claim 1, wherein:
said cover means is formed so as to mate in form fitting engagement with said guide sleeve.

16. In a brush mount on electric motors equipped with a radio-interference suppression choke, particularly for household appliances such as vacuum cleaners and the like, having a support part of non-conductive material which is fastened to a motor frame, and a guide sleeve of conductive material for a carbon brush and its biasing spring being inserted in the support part in a form-fitting manner axially non-displaceably between two side walls extending from a web of the support part, the rear end of the guide sleeve having a connection lug for a conductor of the carbon brush, the improvement comprising a cover means for supporting the guide sleeve is supported on the side walls, the web of the support part forms wing portions which respectively project outwardly beyond said side walls, said wing portions constitute resting surfaces for spring-tensioned mounting of the support part on the motor frame, a plug-type distribution plate positioned on said support part, an end portion of the support part in the vicinity of the sides of the side walls being formed with respective opening means for positioning of the radio-interference suppression choke and for positioning of said plug-type distribution plate, respectively, one of said opening means for positioning of the plug distribution plate is formed in said web, and a plug portion of said plug distribution plate is received in said one opening means, lugs on the support part projecting away from the web on both sides of said one opening means, the latter holding the plug portion of the plug distribution plate.

17. In a brush mount on electric motors equipped with a radio-interference suppression choke, particularly for household appliances such as vacuum cleaners and the like, having a support part of non-conductive material which is fastened to a motor frame, and a guide sleeve of conductive material for a carbon brush and its biasing spring being inserted in the support part in a form-fitting manner axially non-displaceably between two side walls extending from a web of the support part, the rear end of the guide sleeve having a connection lug for a conductor of the carbon brush, the improvement comprising a cover means for supporting the guide sleeve is supported on the side walls, the web of the support part forms wing portions which respectively project outwardly beyond said side walls, said wing portions constitute resting surfaces for spring-tensioned mounting of the support part on the motor frame, a plug-type distribution plate positioned on said support part, an end portion of the support part in the vicinity of the sides of the side walls being formed with respective opening means for positioning of the radio-interference suppression choke and for positioning of said plug-type distribution plate, respectively, said plug distribution plate has a yoke portion, a connecting plug is engageable in the yoke portion of said plug distribution plate for contact with said plug distribution plate at predetermined locations on said plug distribution plate, said yoke portion is disposed intermediate two resting portions of said plug distribution plate, and said two resting portions and said yoke portion comprise said predetermined locations for contact with said connecting plug, one of said resting portions is bent toward said yoke portion relative to said other rest portion such that engagement of said connecting plug in said yoke portion and disposition of said connecting plug against said one resting portion causes the bend of said one resting portion to exert a contact force against the connecting plug at said one resting portion, thereby forcing said connecting plug to make contact against said yoke portion.

18. The brush mount as set forth in claim 17, wherein an end of said connecting plug engages the bend of said one resting portion and the bend of said one resting portion is of predetermined magnitude to form a run-on bevel for the end of the connecting plug that causes said connecting plug to press at said yoke portion such that said connecting plug engages said other resting portion in forcible contact.

19. The brush mount as set forth in claim 17, wherein said bend is at an edge portion of said plug distribution plate.

20. In a brush mount on electric motors equipped with a radio-interference suppression choke, particularly for household appliances such as vacuum cleaners and the like, having a support part of non-conductive material which is fastened to a motor frame, and a guide sleeve of conductive material for a carbon brush and its biasing spring being inserted in the support part in a form-fitting manner axially non-displaceably between two side walls extending from a web of the support part, the rear end of the guide sleeve having a connection lug for a conductor of the carbon brush, the improvement comprising a cover means for supporting the guide sleeve is supported on the side walls, the web of the support part forms wing portions which respectively project outwardly beyond said side walls, said wing portions constitute resting surfaces for spring-tensioned mounting of the support part on the motor frame, a plug-type distribution plate positioned on said support part, an end portion of the support part in the vicinity of the sides of the side walls being formed with respective opening means for positioning of the radio-interference suppression choke and for positioning of said plug-type distribution plate, respectively, said wing portions have edges with cut-outs formed therein, said motor frame has ribs that engage in form-locked manner into said cut-outs, the guide sleeve has a closed annular shape and includes a plurality of walls having engageable edges formed with a mating dovetail.

* * * * *